(12) United States Patent
Dorring et al.

(10) Patent No.: US 7,636,524 B2
(45) Date of Patent: Dec. 22, 2009

(54) ALL-OPTICAL TIMING JITTER MEASUREMENT SYSTEM AND METHOD

(75) Inventors: Jochen Karl Walter Dorring, Baltimore, MD (US); Yung Jui Chen, Ellicott City, MD (US)

(73) Assignee: University of Maryland, Baltimore County, Baltimore, MD (US)

( * ) Notice: Subject to any disclaimer, the term of this patent is extended or adjusted under 35 U.S.C. 154(b) by 1221 days.

(21) Appl. No.: 10/292,464

(22) Filed: Nov. 13, 2002

(65) Prior Publication Data

US 2003/0095304 A1      May 22, 2003

Related U.S. Application Data

(60) Provisional application No. 60/338,079, filed on Nov. 13, 2001.

(51) Int. Cl.
  H04B 10/00     (2006.01)
  H04B 10/08     (2006.01)
  H04B 10/12     (2006.01)

(52) U.S. Cl. .............. 398/159; 398/27; 398/29; 398/147; 398/161

(58) Field of Classification Search ............. 398/25–27, 398/29, 38, 81, 93, 147, 149, 154, 158, 159, 398/161
  See application file for complete search history.

(56) References Cited

U.S. PATENT DOCUMENTS

| | | | |
|---|---|---|---|
| 3,937,945 A | 2/1976 | Fitzmaurice et al. | |
| 4,350,879 A * | 9/1982 | Feher | 377/28 |
| 5,729,372 A | 3/1998 | Terahara et al. | |
| 5,949,560 A | 9/1999 | Roberts et al. | |
| 6,252,692 B1 * | 6/2001 | Roberts | 398/147 |
| 6,396,601 B1 * | 5/2002 | Takara et al. | 398/9 |
| 6,445,471 B1 | 9/2002 | Shimokawa et al. | |
| 2002/0176129 A1 * | 11/2002 | Dinu et al. | 359/110 |

OTHER PUBLICATIONS

Mirasso, C.R., Colet, P., San Miguel, M.: Dependence of timing jitter on bias level, for single-mode semiconductor lasers under high speed operation, Quantum Electronics, IEEE Journal of, V. 29, Issue 1, Jan. 1993 pp. 23-32.*

Holzlohner, R et al., "Accurate calculation of eye diagrams and bit error rates on optical transmission using linearization", Lightwave Technology, Journal of, V. 20, Issue 3, Mar. 2002, pp. 389-400.*

* cited by examiner

Primary Examiner—Dalzid Singh
(74) Attorney, Agent, or Firm—Rene A. Vazquez (57) ABSTRACT

A timing jitter measurement system and method is provided that acquires the timing jitter in an all-optical fashion, by extracting the timing jitter probability distribution function using auto-correlation and cross-correlation data. This makes the system and method of the present invention particularly useful for ultra-high bit rates, where power spectrum analysis cannot be applied. The resolution of the timing jitter measurement system and method is higher than the actual pulse width, and depends on the time resolution of the correlator. The system and method of the present invention facilitates the identification of deterministic or random timing jitters or combinations thereof, and therefore can be used to identify the origins of timing jitters within the optical network and to provide feedback to the optical network that can be used to actively control the timing jitter.

28 Claims, 5 Drawing Sheets

ALL-OPTICAL TIMING JITTER MEASUREMENT SYSTEM AND METHOD

CROSS-REFERENCE TO RELATED APPLICATIONS

This present application claims the benefit of provisional U.S. Patent Application Ser. No. 60/338,079, filed on Nov. 13, 2001. The contents of this provisional application is incorporated herein by reference.

GOVERNMENT RIGHTS

This invention was made with United States Government support under Contract Nos. MDA904-00-C-209 and MDA904-99-C-2505 awarded by the National Security Agency. The United States Government has certain rights in this invention.

BACKGROUND OF THE INVENTION

1. Field of the Invention

This invention relates to the monitoring of optical signal quality in optical networks and, more particularly, to an all-optical system and method for measuring timing jitters of ultra-high-bit-rate optical signals.

2. Background of the Related Art

The monitoring of signal quality in ultra-fast optical networks is a crucial aspect of optical networking. Two major contributors to the bit-error-rate are timing jitter and amplitude jitter. As data transmission rates increase to 40 GHz and beyond, the detection of both jitters by electronic means becomes very complex and costly. Moreover, common jitter measurements using the so-called eye-diagram are flawed, because the experimental results do not necessarily support the conclusion that the signal degradation is due to either timing jitter, amplitude jitter, or a combination of both. In general, additional assumptions based on the knowledge of the jitters' origin are required to allow the evaluation of both types of jitter.

Recent advances in the areas of low-jitter laser sources and high-bit-rate optical networks have boosted the network bit rate to 40 Gbps and beyond. At these higher bit rates, timing jitter is one of the major factors affecting system performance. Timing jitter increases the bit-error-rate in long-haul data transmission systems. Thus, there is a need for time-resolved jitter monitoring and measurement techniques.

Traditional power spectrum analysis techniques for measuring timing jitter, such as those discussed in Von Der Linde., "Characterization of the noise in continuously operating mode-locked lasers", Appl. Phys. B., Vol. B39, No. 4, pp. 201-17 (1986), are not always suitable for applications involving ultra-high repetition rates. This is, in part, because of the so-called "electronic barrier", i.e., the necessary electronics may not be readily available or lacks precision as the data rate increases. In the GHz range, only a few jitter experiments have been reported on harmonically mode-locked fiber lasers. See, for example, T. F. Carruthers et al., "10-GHz, 1.3-ps erbium fiber laser employing soliton pulse shortening", Opt. Lett., Vol. 21, No. 23, pp. 1927-9 (1996). In T. R. Clark et al., "Sub-10 femtosecond timing jitter of a 10-GHz harmonically mode-locked fiber laser", OFC/IOOC 1999, PD24/1-3, a measurement of a 10 GHz fiber laser is described that achieved a precision exceeding 10 fs by employing a doubly balanced mixer to shift the RF spectrum of interest down to low frequencies. Nevertheless, a considerable amount of high-speed electronics is required, including a high frequency reference electronic or electrical signal from the source, such as that described in G. Sucha et al., "A new method for rapid temporal scanning of ultrafast lasers", IEEE J. Sel. Top. Quantum Electron., Vol. 2, No. 3, pp. 605-21 (1996). Today's ultra-high-bit-rate optical networks require a timing-jitter monitoring system with temporal resolutions down to fractions of the intrinsic temporal pulse width itself.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

To achieve the objects, and in accordance with the purpose of the invention, as embodied and broadly described herein, the timing jitter measurement system and method of the present invention acquires the timing jitter in an all-optical fashion, by extracting the timing jitter probability distribution function using auto-correlation and cross-correlation data. This makes the system and method of the present invention particularly useful for ultra-high bit rates, where power spectrum analysis cannot be applied. The resolution of the timing jitter measurement system and method is higher than the actual pulse width, and depends on the time resolution of the correlator.

The system and method of the present invention facilitates the identification of deterministic or random timing jitters or combinations thereof, and therefore can be used to identify the origins of timing jitters within the optical network and to provide feedback to the optical network that can be used to actively control the timing jitter. The system and method of the present invention are independent of amplitude jitter and insensitive to ultra-high repetition rates. Thus, the system and method of the present invention can be a valuable diagnostic timing jitter tool for ultra-high bit rate optical networks.

The present invention can be achieved, in whole or in part, by a method of characterizing a pulsed optical signal, comprising optically correlating at least two optical pulses from the pulsed optical signal, and deriving a timing jitter probability distribution function (PDF) with optical correlation data obtained from the optical correlation measurements.

The present invention can also be achieved, in whole or in part, by a method of characterizing first and second pulsed optical signals, comprising optically correlating at least two optical pulses in the first pulsed optical signal to yield first optical correlation data, deriving a first timing jitter probability distribution function (PDF) for the first pulsed optical signal with the first optical correlation data, optically correlating at least one optical pulse from the first pulsed optical signal with at least one optical pulse from the second pulsed optical signal to yield second optical correlation data, and deriving a second timing jitter PDF for the second pulsed optical signal using the second optical correlation data and the first timing jitter PDF.

The present invention can also be achieved, in whole or in part, by a method of controlling timing jitter in a pulsed optical system, comprising optically correlating at least two optical pulses, deriving a timing jitter probability distribution function (PDF) with optical correlation data obtained from the optical correlation, and adjusting a parameter of the pulsed optical system based on the timing jitter PDF.

The present invention can also be achieved, in whole or in part, by a method of diagnosing a cause of timing jitter in a pulsed optical system, comprising optically correlating at least two optical pulses, deriving a timing jitter probability distribution function (PDF) with optical correlation data obtained from the optical correlation, and identifying a source of the timing jitter based on the timing jitter PDF.

The present invention can also be achieved, in whole or in part, by a system for characterizing a pulsed optical signal, comprising an optical correlator for correlating at least two optical pulses from the pulsed optical signal to yield an optical correlation signal, and a processor for calculating a timing jitter probability distribution function (PDF) with optical correlation data obtained by the optical correlator.

The present invention can also be achieved, in whole or in part, by an optical network, comprising an optical source for generating a pulsed optical signal, at least one network component for transmitting the pulsed optical signal, and a timing jitter measurement system for measuring a timing jitter of the pulsed optical signal; wherein the timing jitter measurement system comprises an optical correlator for correlating at least two optical pulses from the pulsed optical signal to yield an optical correlation signal and a processor for calculating a timing jitter probability distribution function (PDF) with optical correlation data obtained by the optical correlator.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

The present invention addresses the problems and/or disadvantages of prior systems by utilizing an all-optical timing jitter measurement technique based on intensity auto-correlation (AC) and cross-correlation (XC). The present invention is particularly suited for data transmission rates exceeding 10 GHz. In a preferred embodiment, and a self-referencing technique is used to avoid complex ultra-fast clock recovery. As we will be discussed below, the present invention allows for the reduction or elimination of the effects of amplitude jitter on the optical data stream. This decoupling leads to the assumption-free evaluation of the amplitude jitter, if an eye-diagram is used.

The timing jitter measurement system and method of the present invention can measure the timing jitter regardless of its origin. Random timing jitters, such as those that may originate from various elements of the optical network (e.g., laser sources, clock-recovery circuits) or those that may arise during transmission (Gordon-Haus Jitter) can be detected with the system and method of the present invention. Deterministic timing jitters, such as those caused by nonlinear effects during transmission or imperfect time division multiplexing can also be detected with the system and method of the present invention.

The timing jitter measurement system and method is based on measuring the XC and AC to extract the probability distribution function (PDF) of different types of timing jitters. This approach is based on probability theory, which provides the mathematical framework of random variables and is described in Jay L. Devore, *Probability and Statistics for Engineering and the Sciences, Fourth Edition*, Brooks/Cole Publishing Company (1995). A pulse train is modelled by a continuous random sequence, which is assumed to be identically distributed. Using the timing jitter measurement system and method of the present invention, the PDF can be acquired, which reflects the total jitter information in a statistical fashion. Some of the advantages of full PDF recovery are: (1) the variance of the jitter is obtained; and (2) it is possible to determine whether the jitter is deterministic or random in nature.

Timing jitter can be seen as a displacement of an optical pulse from its assigned position in a pulse train. One can characterize this displacement with a random time variable $\alpha_n$, which represents the actual timing jitter of the $n_{th}$ pulse with respect to its ideal position, which is defined by the repetition rate. Because the present invention employs auto-correlation and cross-correlation, it can only measure the relative timing jitter between two pulse trains. Thus, a random variable $\alpha$ is used to express the timing jitter between pulse n in pulse train 1 and pulse m in pulse train 2, regardless of their absolute position in the pulse train. The variable $\alpha$, also referred to as the "relative timing jitter" is related to the actual timing jitters of pulses n and m as follows:

$$\alpha = \alpha_n - \alpha_m \quad (1)$$

where the random time variables $\alpha_n$ and $\alpha_m$ stand for the actual timing jitters of the $n_{th}$ and $m_{th}$ pulses, respectively, with respect to their ideal positions defined by the repetition rate.

In general, the timing jitter random variable $\alpha$ does not represent an actual timing jitter. It is used for characterization purposes, in that it is only possible to characterize $\alpha_n$ and $\alpha_m$ by analyzing $\alpha$. Its PDF is induced by the actual timing jitter variables $\alpha_n$, $\alpha_m$ and their PDFs. Therefore, $\alpha$ is also referred to as the "induced timing jitter."

In a simplified cross-correlation of two pulses with arbitrary temporal shapes g(t) and f(t), the total delay consists of a deterministic time delay $\tau$ and the induced timing jitter $\alpha$. The cross-correlation, $C(\tau+\alpha)$, can be expressed as:

$$C(\tau + \alpha) = \int_{-\infty}^{\infty} g(t)f(t + \tau + \alpha)dt. \quad (2)$$

Due to the nature of $\alpha$, $C(\tau+\alpha)$ must be considered a random process and has to be described by probability theory. In general, it is impossible to measure the intrinsic (jitter-free) cross-correlation experimentally. Instead, its expectation value <C> is acquired, which is given by $$<C(\tau)> = \int_{-\infty}^{\infty} p(\alpha)C(\tau+\alpha)d\alpha, \quad (3)$$

where $p(\alpha)$ is referred to as the induced PDF (IPDF). Note that for $p(\alpha)=\delta(\alpha)$, the jitter is absent and the intrinsic cross-correlation $C(\tau)$ is identical to the expectation value $<C(\tau)>$. Experimentally, this is only feasible for the auto-correlation case (f=g and $\alpha$=0). Therefore, an auto-correlation carries only pulse shape information, in contrast to the cross-correlation, which always includes both pulse shape information as well as jitter information.

In principle, the total timing jitter information is contained in $<C(\tau)>$, given by Equation (3), and can be extracted by using the convolution theorem. Let $<X>$, X and $\pi$ be the Fourier-Transforms (FT) of $<C>$, C and p, respectively. In Fourier space, Equation (3) becomes $$\pi(s) = \frac{<X(s)>}{X(s)}, \quad (4)$$

where $<X>$, X and $\pi$ are the Fourier-Transforms (FT) of $<C>$, C and p, respectively. X(s) can be further expressed as $X(s)=\gamma(s)\phi(s)$, with $\gamma(s)=FT(g)$, and $\phi(s)=FT(f)$. Since the auto-correlation functions, $A_g(s)$ and $A_f(s)$, of both pulse envelopes, g(t) and f(t), can be written in the form $A_g(s)=\gamma(S)^2$ and $A_f(s)=\phi(s)^2$, the intrinsic cross-correlation $C(\tau)$ is then expressed in terms of both auto-correlations, and the integral in Equation (3) becomes solvable. After performing an inverse Fourier-Transform on Equation (4), $p(\alpha)$ is obtained as:

$$p(\alpha) = \frac{1}{\sqrt{2\pi}} \int_{-\infty}^{\infty} \frac{<X(s)>}{\sqrt{A_g(s) \cdot A_f(s)}} e^{-i\alpha s} ds. \quad (5)$$

Consequently, the IPDF is a function of the cross-correlation and auto-correlations only, $p(\alpha)=p(<C(\tau)>, A_g(\tau), A_f(\tau))$, all of which can be obtained experimentally. This indicates that the jitter PDF can be readily measured by an all-optical scheme, through the auto-correlations and cross-correlations of the two pulse trains.

However, the jitter information contained in $p(\alpha)$ includes two different jitters, $\alpha_n$ and $\alpha_m$, which need to be addressed separately in order to evaluate their PDFs $p_n(\alpha_n)$ and $p_m(\alpha_m)$, respectively. For their complete evaluation, one has to differentiate two measurement types. The first measurement is a self-scanning timing jitter measurement to measure the timing jitter PDF contained in a first pulse train (intrinsic jitter). It is implemented by setting $p_m=p_n$ and m=n+h, where integer h≠0 determines the time delay. The second measurement scans the self-scanned first pulse train, whose intrinsic PDF is known from the self-scanning measurement, with a second pulse train. In this case, the first pulse train serves as a reference in order to evaluate the PDF of the second pulse train, $p_m(\alpha_m)$.

Self-Scanning Measurement for Obtaining Timing Jitter of a Single Pulse Train

Every pulse train can be used to scan itself without any other reference, such as a clock reference, and therefore measure its particular timing jitter PDF. In practice, this measurement corresponds to a cross-correlation of two pulses from the same laser source, but from different cycles, which can be implemented by a delay line, which is defined by the repetition rate of the pulse train, in one of the optical arms of the intensity auto-correlator. By identifying $A(s)=A_g(s)=A_f(s)$, the induced jitter distribution, according to Equation (5), becomes $$p(\alpha) = \frac{1}{\sqrt{2\pi}} \int_{-\infty}^{\infty} \frac{<X(s)>}{A(s)} e^{-i\alpha s} ds. \quad (6)$$

Since the IPDF $p(\alpha)$ is only defined by the PDF $p_n(\alpha_n)$ the absolute timing jitter can be revealed by performing the deconvolution of $$p(\alpha) = \int_{-\infty}^{\infty} p_n(\alpha_n) p_n(\alpha_n + \alpha) d\alpha_n. \quad (7)$$

For particular shapes of $p(\alpha)$, such as Gaussian, this integral can be solved in a straight forward manner. For a Gaussian pulse shape, $p_n=p(\sqrt{2}\alpha_n)$. Moreover, the variances of the cross-correlation and auto-correlation are related to the variance of the induced PDF by $\sigma_{xc}^2=\sigma_{ac}^2+\sigma^2$, using a zero-mean normalized Gaussian distribution. In this case, the variance of the timing jitter can be calculated without using an FT-based algorithm. The relation of the full-width at half-maximum (FWHM) of the IPDF, the auto-correlation and the cross-correlation, which are $\Delta\tau$, $\Delta\tau_{ac}$ and $\Delta\tau_{xc}$, respectively, is:

$$\frac{\Delta\tau}{\Delta\tau_{ac}} = \sqrt{\left(\frac{\Delta\tau_{xc}}{\Delta\tau_{ac}}\right)^2 - 1} \quad (8)$$

The same equation is valid for the corresponding variances, since $\Delta\tau^2=8\sigma^2\ln 2$. In general, $p(\alpha)$ is a non-Gaussian function and computational methods have to be employed to perform the deconvolution of Equation (7). The precision of the scheme lies well below the auto-correlation width and only depends on the resolution of the auto-correlator and on $\Delta\tau_{ac}$ itself. In good approximation we can assume for small jitters that $\sigma_{ac}^2>>\sigma^2$, whereas the smallest measurable FWHM $\Delta\tau_{min}$ of $p_n(\alpha_n)$ is given by $$\Delta\tau_{min} \approx \sqrt{R \cdot \Delta\tau_{ac}} \quad (9)$$

The smallest resolvable time fraction R is a constant, which is specified by the auto/cross-correlator. It is preferable to compress the pulses before commencing the timing jitter measurement.

Scanning Measurement for Obtaining Timing Jitter of a Pulse Train Using Another Pulse Train with a Known Timing Jitter PDF In this experiment two pulse trains from different sources are cross-correlated with each other. The timing jitter PDF of one pulse train, $p_n(\alpha_n)$, is known and therefore the convolution integral can be used to calculate the probability distribution $p_m(\alpha_m)$ using the FT and a similar analysis as done in Equations (3) and (4), as follows:

$$p(\alpha) = \int_{-\infty}^{\infty} p_n(\alpha_n) p_m(\alpha_n + \alpha) d\alpha_n. \qquad (10)$$

This scheme is amplitude jitter insensitive, since it can be safely assumed that, in first order, timing jitter and amplitude jitter are independent from each other. Considering both amplitude and timing jitter, the expectation value of the cross-correlation takes the form $$C(\tau + \alpha, \beta_n, \beta_m) = \int_{-\infty}^{\infty} (1 + \beta_n)^2 g(t)(1 + \beta_m)^2 f(t + \tau + \alpha) dt \qquad (11)$$

The zero-mean random variables $\beta_n$ and $\beta_m$ describe the amplitude jitter of each pulse. Since we can assume that they are time independent, the expectation value <C> can be separated into two parts, one depends on the timing jitter and the other on the amplitude jitter, exclusively, as follows:

$$<C(\tau)> = k(\beta_n, \beta_m) \int_{-\infty}^{\infty} p(\alpha) C(\tau + \alpha) d\alpha, \qquad (12)$$

with $$k = \int_{-\infty}^{\infty} p_{\beta_n}(\beta_n)(1+\beta_n)^2 d\beta_n \int_{-\infty}^{\infty} p_{\beta_m}(\beta_m)(1+\beta_m)^2 d\beta_m.$$

As a result, the amplitude jitter only scales the amplitude and hence does not affect the shape of the cross-correlation. Furthermore, it is possible to identify deterministic and random timing jitter. In general, every PDF departing from a Gaussian shape indicates a deterministic cause, which is particularly useful if the origin of the jitter within the network must be identified. For example, in an analysis of multiplexed TDM signals, a certain subsequence of pulses may represent a repetitive sequence of deterministic jitters.

Timing Jitter Measurement System

Figure 1:
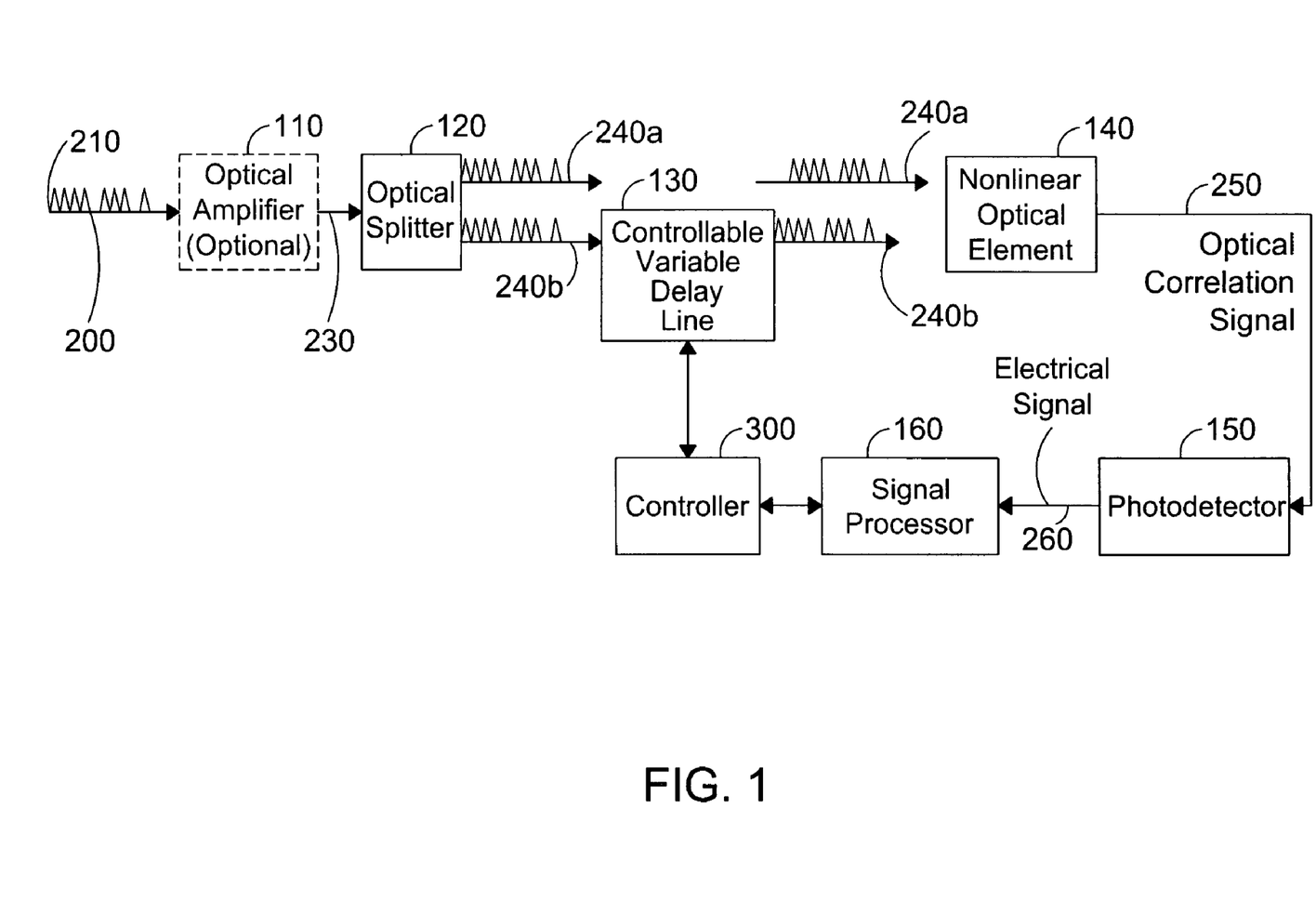
FIG. 1 is a block diagram of a timing jitter measurement system, in accordance with one embodiment of the present invention.

FIG. 1 is a block diagram of a timing jitter measurement system 100, in accordance with one embodiment of the present invention. The system includes an optional amplifier 110, an optical splitter 120, a controllable variable delay line 130, a nonlinear optical element 140, a photodetector 150, a signal processor 160 and a controller 300.

In operation, an input optical pulse train 200, comprising a plurality of optical pulses 210, is optionally amplified by the optical amplifier 110. The amplified optical pulse train 230 is received by the optical splitter 120, which splits the amplified optical pulse train into identical first and second pulse trains 240a and 240b, respectively. One of the pulse trains 240b is sent to the controllable variable delay line, which delays the pulse train 240b with respect to the other pulse train 240a.

The nonlinear optical element 140, preferably a second harmonic generator, correlates the two optical pulse trains 240a and 240b and generates an optical correlation signal 250. The optical correlation signal 250 is detected by the photodetector 150, and converts the optical correlation signal to an electrical signal 260. The signal processor 160 performs timing jitter analysis on the electrical signal 260 in accordance with the methods described above.

The scanning of the controllable variable delay line 130 is controlled by the controller 300 so as to obtain an auto-correlation and cross-correlation of the two pulse trains 240a and 240b by the nonlinear optical element 140. The signal processor 160 may send the results of the timing jitter analysis to the controller 300 for storage, or for use as a feedback signal that may be used to actively mitigate the timing jitter.

For example, as discussed above, a timing jitter PDF that departs from a Gaussian shape likely indicates a deterministic cause for the timing jitter. The present invention can be used to associate different non-Gaussian timing jitter PDF shapes with specific timing jitter sources. This data can be stored in the controller as, for example, a look-up table, and the source of a timing jitter could then be identified using the shape of the timing jitter PDF and the look-up table. Once the source of the timing jitter is identified, it may be possible to reduce or eliminate the timing jitter. For example, if the source of the timing jitter is determined to be the source laser, certain laser parameters may be adjusted to reduce the timing jitter.

Figure 2:
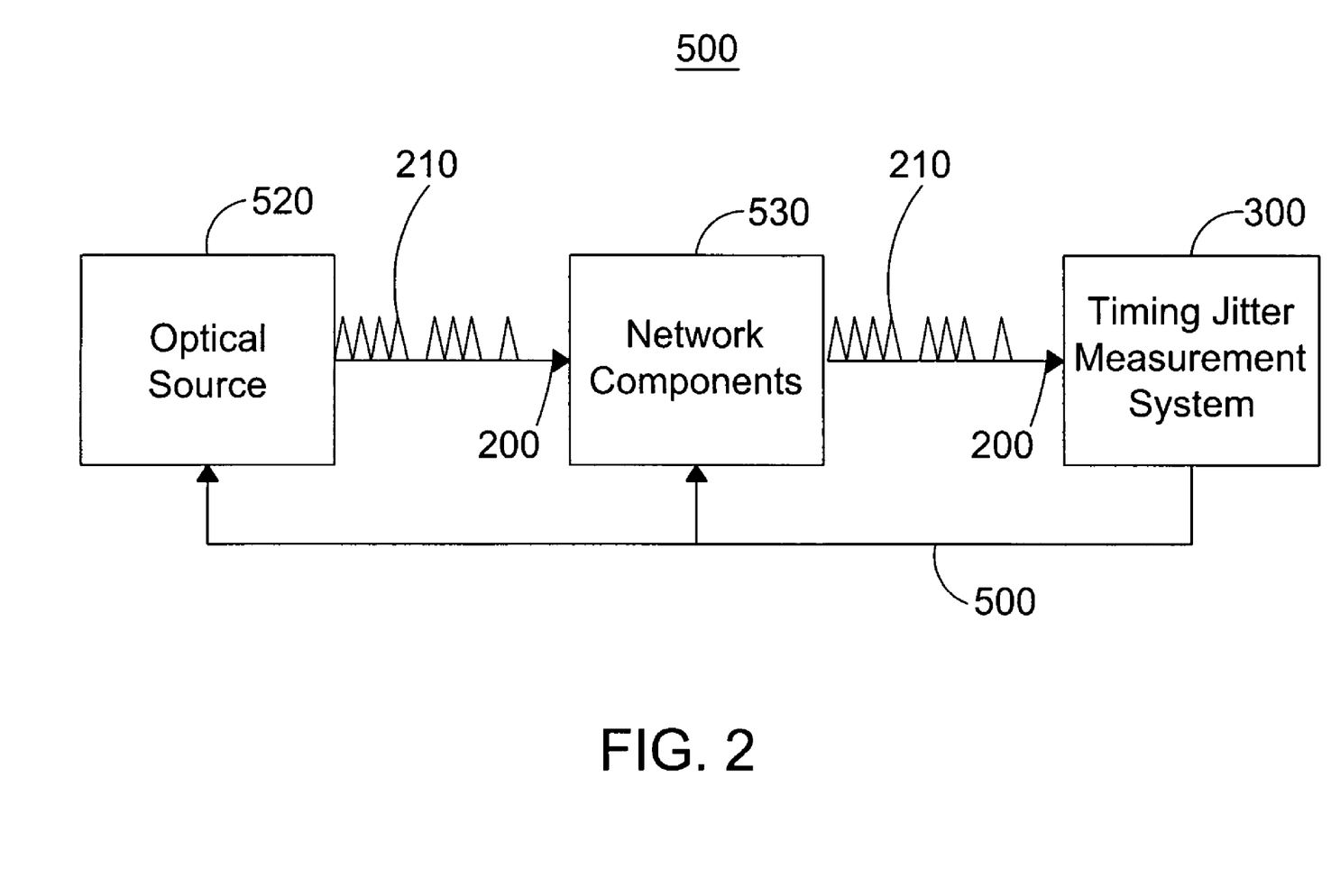
FIG. 2 is a block diagram of an optical network incorporating the timing jitter measurement system of the present invention.

The system 100 could also provide active feedback, in which the results of the timing jitter analysis is used by the controller 300 to provide active feedback to one or more components of the optical network to reduce the timing jitter. This is illustrated in FIG. 2, which is a block diagram of an optical network 500 incorporating the timing jitter measurement system 300 of the present invention. As shown in FIG. 2, the timing jitter measurement system 300 can provide an active feedback signal 510 to the optical source 520 and/or any of the network components 530, such as optically active components, based on the results of the timing jitter analysis.

Since the transmission conditions for optical data depend on a complexity of linear and nonlinear interactions of various effects it is desirable that a feedback to any of the active components in the network is an option, based on the respective network structure. Active components are devices, which generate or change the power, synchronization or intensity profile of an optical signal.

The timing jitter measurement system 100 is an "all-optical" system in that the auto-correlation and cross-correlation take place in the ultra-fast optical domain and the signal detection and electronic signal processing at very low transmission speeds. In contrast, prior methods of measuring the timing jitter, such as power spectrum analysis, require considerable electronic means, which cannot be employed for higher data transmission rates. The timing jitter measurement system 100 is upward compatible, i.e. it can be used to measure signals of future high bit rates.

The timing jitter measurement system 100 stands in contrast to electronic timing jitter measurements, which use either an ultra-fast detector at the speed of the optical signal, or a balanced electronic mixer in combination with an electronic reference signal, both in combination with an electronic local oscillator. For optical networks, both solutions are eventually. limited by the speed of the electronic detectors, whereas the timing jitter measurement system 100 always detects as fast as the repetition speed of the signal itself.

The amplifier 110, optical splitter 120, controllable variable delay line 130, nonlinear optical element 140 and photodetector 150 are well known components that may be implemented in any manner known in the art. The signal processor 160 and/or the controller 300 can be implemented on a server, which may be or include, for instance, a work station running the Microsoft Windows™ NT™, Windows™ 2000, UNIX, LINUX, XENIX, IBM, AIX, Hewlett-Packard UX™, Novel™, Sun Micro Systems Solaris™, OS/2™, BeOS™, Mach, Apache Open Step™, or other operating system or platform. However, the signal processor 160 and/or the controller 300 could also be implemented on a programmed general purpose computer, a special purpose computer, a programmed microprocessor or microcontroller and peripheral integrated circuit elements, an ASIC or other integrated circuit, a hardwired electronic or logic circuit such as a discrete element circuit, a programmable logic device such as a FPGA, PLD, PLA, or PAL, or the like. In general, any device on which a finite state machine capable of implementing the mathematical routines and methods discussed above can be used to implement signal processor 160 and/or the controller 300.

Comparison with RF Techniques

The timing jitter measurement system and method of the present invention was compared to standard RF techniques. For that purpose, it is preferable to use a passively mode-locked fiber laser, because they typically operate at lower (MHz) repetition rates and therefore enable the straightforward employment of a common RF technique for comparison purposes.

Figure 3:
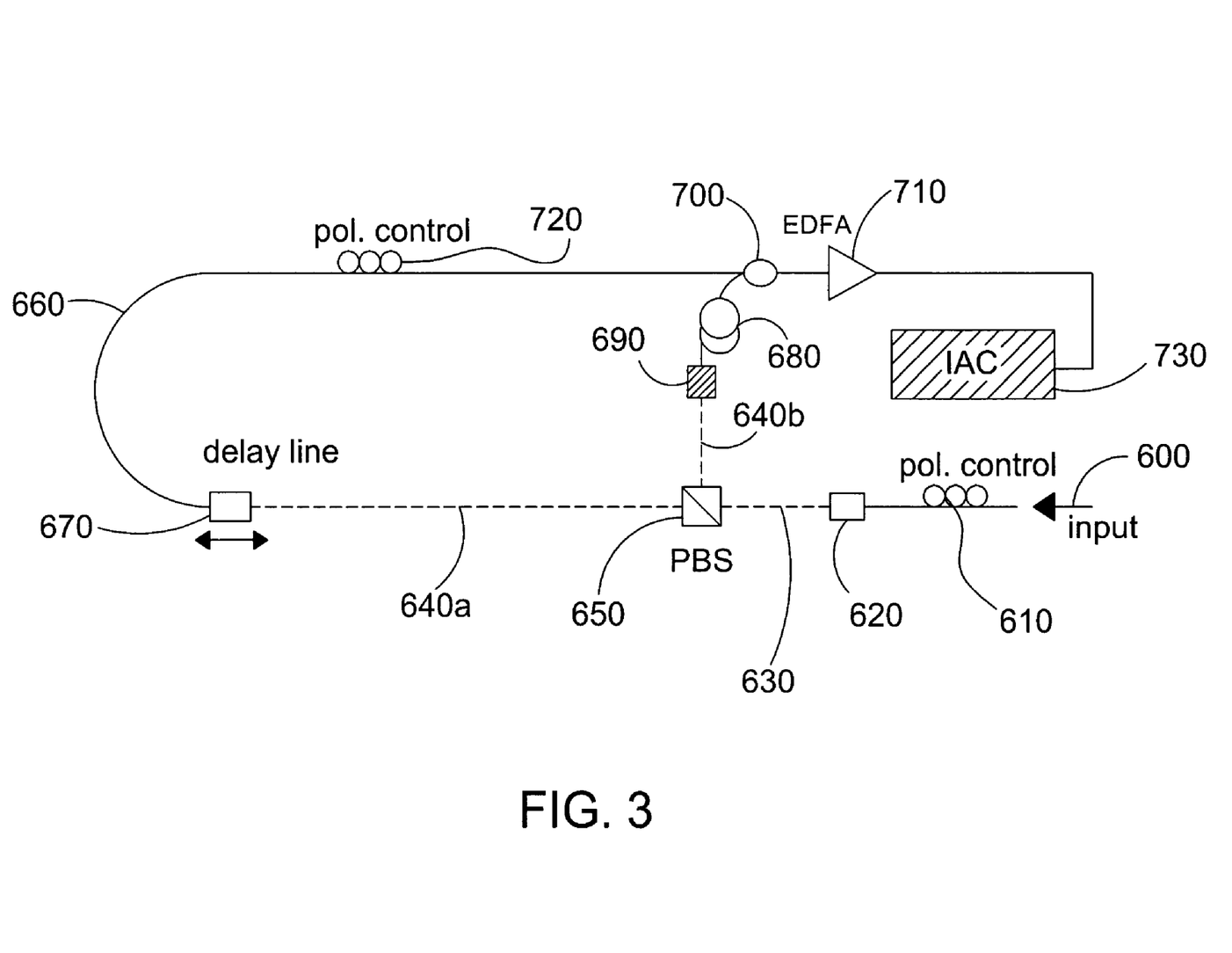
FIG. 3 is a schematic diagram of system used to test the timing jitter measurement methods of the present invention.

FIG. 3 is a schematic diagram of a system used to test the timing jitter measurement methods of the present invention. Input optical pulses 600 are launched into a manual polarization controller 610. The manual polarization controller 610 is used to optimize the linear polarization orientation for an equal power split between both reference beams 640a and 640b when passing through a polarizing beam splitter (PBS) 650.

The input optical pulses 600 are generated by a passively mode-locked fiber laser (not shown) manufactured by Pritel, Inc., which has a fundamental repetition rate of 76 MHz. The input optical pulses 600 have a temporal duration of 1 ps and a spectral width of 4 nm. The source laser is operated at its second harmonic (152 MHz).

The optical pulses exit the manual polarization controller 610 and exit the fiber to enter free space at the collimator 620. The collimated signal 630 is then split into two separate signals 640a and 640b by PBS 650. Signal 640a travels a longer path than signal 640b. The path length difference in free space is approximately 1.96, and corresponds to approximately one repetition cycle. This ensures that the pulses in each signal 640a and 640b undergo substantially the same amount of chromatic dispersion.

Signal 640a is ultimately launched into fiber 660 with input coupler 670 and passes through a second manual polarization controller 720 to match the polarization state to that of signal 640b, which is launched into fiber 680 with input coupler 690. These signals 640a and 640b are recombined with fiber coupler 700 to form a series of pulse pairs, with each pulse in a pulse pair originating from a different laser cycle. The pulse pairs are then amplified by an Erbium-doped fiber amplifier (EDFA) 710, and coupled into an intensity auto-correlator (IAC) 730.

Figure 4:
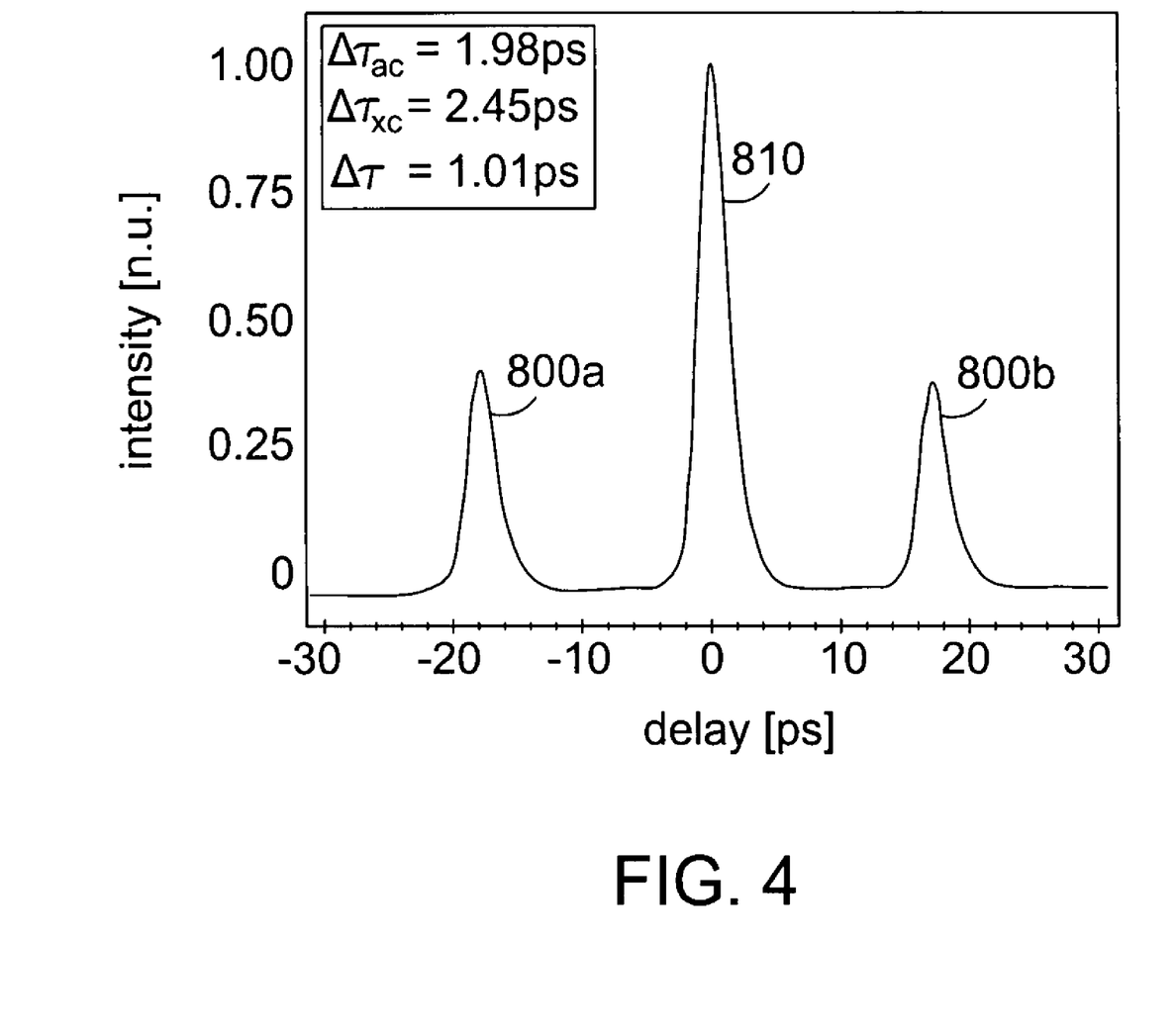
FIG. 4 is a plot of optical correlation traces generated by the system of FIG. 3.

Inside the IAC 730, the pulse pairs are split once more in a Michelson Interferometer (not shown) and correlated with each other. The IAC 730 was designed by the company Femtochrome, Inc., and continuously scanned the variable delay line in the Michelson Interferometer at the very low repetition rate of 60 Hz. The correlation of each pulse pair is a triple-peak trace, as shown in FIG. 4.

The first and last peaks 800a and 800b of the triple-peak trace correspond to the correlation of two pulses from different cycles and represent the cross-correlations. The center peak 810 is the auto-correlation. As discussed above, given the auto-correlation and the cross-correlation, the PDF of the timing jitter can be determined. Since the correlation peaks 800a, 800b and 810 are very close to a Gaussian shape, the PDF is also Gaussian-like. Therefore, Equation (8) above can be applied, leading to the rms timing jitter for Gaussian correlations:

$$j_{XC} = \frac{1}{2}\sqrt{\frac{\Delta \tau_{XC}^2 - \Delta \tau_{APM}^2}{2 \ln 2}} = 0.61 \text{ ps} \tag{13}$$

Due to the error progression, the true jitter value is in the interval of 0.61±0.20 ps. The timing jitter was also calculated with an RF method, as follows:

$$j_{RF} = \frac{1}{2\pi n f}\sqrt{\frac{P_n}{P_c}} = 0.54 \text{ ps} \tag{14}$$

Figure 5:
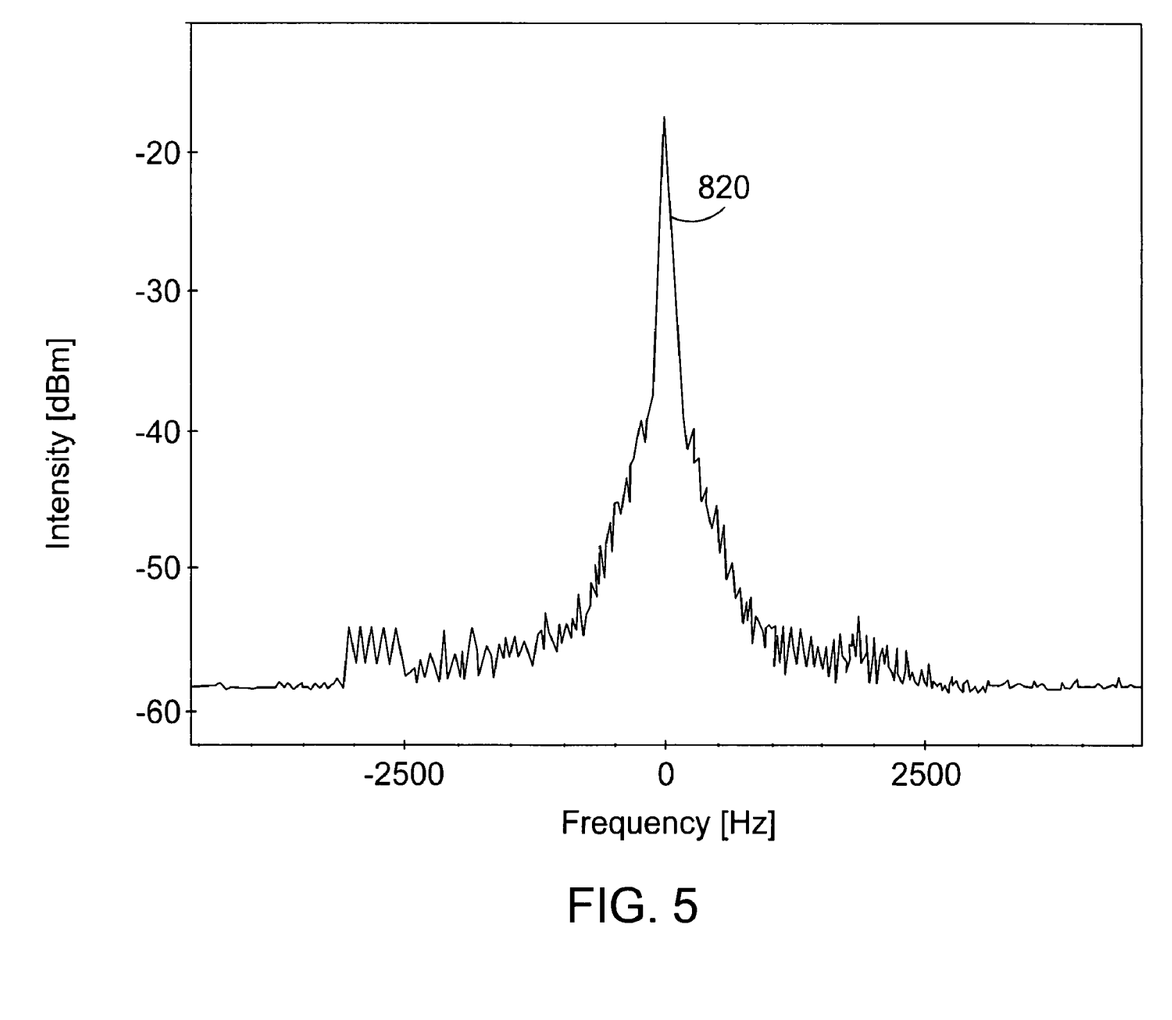
FIG. 5 is a plot of the $30^{th}$ harmonic of the laser used to create the input signal in the system of FIG. 3.

In Equation (14), n represents the harmonic of the RF-spectrum, f the repetition rate of the laser and $P_c$ and $P_n$ are the noise power and signal power, respectively. The RF method measurement was based on the evaluation of the laser noise of the $30^{th}$ harmonic 820 of the fiber laser, as shown in FIG. 5. This yielded an interval of 0.54±0.16 ps, which is in good agreement with the result of 0.61±0.20 ps obtained with the timing jitter measurement system and method of the present invention.

Additional experiments have been performed, in which timing jitters due to long-haul propagation were measured. These experiments are described in J. Dörring et al., "All-Optical timing jitter measurements on 40 Gbps pseudorandom RZ data after long-haul transmission in a dispersion-managed soliton system", IEEE Elec. Lett., Vol. 38, No. 14, pp. 727-29 (2002) and J. Dörring et al., "Timing Jitter Measurement of 40 Gbit/s RZ Raman Loop Data using Gated Auto- and Cross-correlation", Optical Fiber Communication Conference (OFC) 2002, ThQ3, both of which are incorporated by reference herein in their entirety.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A method of characterizing a pulsed optical signal, comprising:
   optically correlating at least two optical pulses from the pulsed optical signal using a self-referencing technique;
   deriving a timing jitter probability distribution function (PDF) with optical correlation data obtained from the optical correlation; and
   identifying and characterizing timing jitter in the pulsed optical signal based on the timing jitter PDF.

2. A method of characterizing first and second pulsed optical signals, comprising:
   optically correlating at least two optical pulses in the first pulsed optical signal to yield first optical correlation data;
   deriving a first timing jitter probability distribution function (PDF) for the first pulsed optical signal with the first optical correlation data;

optically correlating at least one optical pulse from the first pulsed optical signal with at least one optical pulse from the second pulsed optical signal to yield second optical correlation data;

deriving a second timing jitter PDF for the second pulsed optical signal using the second optical correlation data and the first timing jitter PDF; and identifying and characterizing first and second timing jitters in the pulsed optical signal based on the first and second timing jitter PDFs, respectively.

3. The method of claim 2, wherein the at least two optical pulses in the first pulsed optical signal are optically correlated with a self-referencing technique.

4. The method of claim 2, wherein the at least two optical pulses in the first pulsed optical signal are optically correlated by:

dividing the first pulsed optical signal into two separate pulsed optical signals; and correlating the two separate pulsed optical signals.

5. The method of claim 2, wherein the step of optically correlating at least one optical pulse from the first pulsed optical signal with at least one optical pulse from the second pulsed optical signal comprises performing an auto-correlation and a cross-correlation.

6. A method of controlling timing jitter in a pulsed optical system, comprising:

optically correlating at least two optical pulses with a self-referencing technique;

deriving a timing jitter probability distribution function (PDF) with optical correlation data obtained from the optical correlation; and adjusting a parameter of the pulsed optical system based on the timing jitter PDF.

7. The method of claim 6, wherein the step of correlating the two separate optical signals comprises performing an auto-correlation and a cross-correlation of the two separate optical signals.

8. A method of determining a cause of timing jitter in a pulsed optical system, comprising:

optically correlating at least two optical pulses with a self-referencing technique;

deriving a timing jitter probability distribution function (PDF with optical correlation data obtained from the optical correlation; and determining the physical cause of the timing jitter based on the timing jitter PDF.

9. The method of claim 8, wherein the step of determining information as to the cause of the timing jitter comprises determining an extent to which the timing jitter is due to deterministic effects by determining an extent to which the timing jitter PDF differs from a Gaussian distribution.

10. A method of determining timing jitter in an optical pulse train, comprising:

performing an optical auto-correlation of the pulse train to yield first information;

performing an optical cross-correlation of the pulse train with itself delayed to yield second information; and determining the timing jitter in the optical pulse train using the first and second information.

11. A system for characterizing a pulsed optical signal, comprising:

an optical splitter for splitting the pulsed optical signal into first and second pulsed optical signals;

an optical correlator for correlating at least two optical pulses from the pulsed optical signal to yield an optical correlation signal; and a processor for calculating a timing jitter probability distribution function (PDF) with optical correlation data obtained by the optical correlator.

12. The system of claim 11, wherein the optical correlator comprises:

a controllable variable delay line for selectively imparting a variable delay onto the first pulsed optical signal; and a nonlinear optical element that correlates the first pulsed optical signal transmitted through the controllable variable delay line with the second pulsed optical signal.

13. The system of claim 11, further comprising a photodetector for detecting the optical correlation signal, converting the optical correlation signal into an electrical signal and sending the electrical signal to the processor for analysis.

14. The system of claim 12, wherein the controllable variable delay line varies the delay imparted on the first pulsed optical signal such that the first and second pulsed optical signals are auto-correlated and cross-correlated by the nonlinear optical element.

15. An optical network comprising the system of claim 11.

16. An optical network, comprising:

an optical source for generating a pulsed optical signal;

an optical splitter for splitting the pulsed optical signal into first and second pulsed optical signals;

at least one network component for transmitting the pulsed optical signal; and a timing jitter measurement system for measuring a timing jitter of the pulsed optical signal, wherein the timing jitter measurement system comprises, an optical correlator for correlating at least two optical pulses from the pulsed optical signal to yield an optical correlation signal, and a processor for calculating a timing jitter probability distribution function (PDF) with optical correlation data obtained by the optical correlator.

17. The network of claim 16, wherein the optical correlator comprises:

a controllable variable delay line for selectively imparting a variable delay onto the first pulsed optical signal; and a nonlinear optical element that correlates the first pulsed optical signal transmitted through the controllable variable delay line with the second pulsed optical signal.

18. The network of claim 16, wherein the timing jitter measurement system further comprises a photodetector for detecting the optical correlation signal, converting the optical correlation signal into an electrical signal and sending the electrical signal to the processor for analysis.

19. The network of claim 17, wherein the controllable variable delay line varies the delay imparted on the first pulsed optical signal such that the first and second pulsed optical signals are auto-correlated and cross-correlated by the nonlinear optical element.

20. A method of characterizing a pulsed optical signal, comprising:

optically correlating at least two optical pulses from the pulsed optical signal by dividing the pulsed optical signal into two separate pulsed optical signals and correlating the two separated pulsed optical signals;

deriving a timing jitter probability distribution function (PDF) with optical correlation data obtained from the optical correlation; and identifying and characterizing timing jitter in the pulsed optical signal based on the timing jitter PDF.

21. The method of claim 20, wherein the step of correlating the two separate optical signals comprises performing an auto-correlation and a cross-correlation of the two separate optical signals.

22. The method of claim 20, wherein a timing jitter is calculated based on full-widths at half-maximums (FWHMs) of auto-correlation and cross-correlation data.

23. A method of controlling timing jitter in a pulsed optical system, comprising:
- optically correlating at least two optical pulses by dividing the pulsed optical signal into two separate pulsed optical signals and correlating the two separated pulsed optical signals;
- deriving a timing jitter probability distribution function (PDF) with optical correlation data obtained from the optical correlation; and
- adjusting a parameter of the pulsed optical system based on the timing jitter PDF.

24. The method of claim 23, wherein the step of correlating the two separate optical signals comprises performing an auto-correlation and a cross-correlation of the two separate optical signals.

25. A method of determining a cause of timing jitter in a pulsed optical system, comprising:
- optically correlating at least two optical pulses;
- deriving a timing jitter probability distribution function (PD$ with optical correlation data obtained from the optical correlation; and
- determining an extent to which the timing jitter is due to deterministic effects by determining an extent to which the timing jitter PDF differs from a Gaussian distribution.

26. A method of determining a cause of timing jitter in a pulsed optical system, comprising:
- optically correlating at least two optical pulses by dividing the pulsed optical signal into two separate pulsed optical signals and correlating the two separated pulsed optical signals;
- deriving a timing jitter probability distribution function (PDF) with optical correlation data obtained from the optical correlation; and
- identifying the physical cause of the timing jitter based on the timing jitter PDF.

27. The method of claim 26, wherein the step of correlating the two separate optical signals comprises performing an auto-correlation and a cross-correlation of the two separate optical signals.

28. An optical network, comprising:
- an optical source for generating a pulsed optical signal;
- at least one network component for transmitting the pulsed optical signal; and
- a timing jitter measurement system for measuring a timing jitter of the pulsed optical signal and for generating a feedback signal for providing timing jitter feedback to the optical source and/or the at least one network component, wherein the timing jitter measurement system comprises,
    - an optical correlator for correlating at least two optical pulses from the pulsed optical signal to yield an optical correlation signal, and
    - a processor for calculating a timing jitter probability distribution function (PD F) with optical correlation data obtained by the optical correlator.

* * * * *